(12) United States Patent
Chan et al.

(10) Patent No.: US 8,228,646 B2
(45) Date of Patent: Jul. 24, 2012

(54) APPARATUS AND METHOD FOR DRAINING STORED POWER

(75) Inventors: Chun-Kong Chan, Hsin Chuang (TW); Po-Yuan Yu, Hsin Chuang (TW)

(73) Assignee: Lien Chang Electronic Enterprise Co., Ltd., Hsin Chuang, Taipei County (TW)

( * ) Notice: Subject to any disclaimer, the term of this patent is extended or adjusted under 35 U.S.C. 154(b) by 294 days.

(21) Appl. No.: 12/620,952

(22) Filed: Nov. 18, 2009

(65) Prior Publication Data
US 2011/0116203 A1    May 19, 2011

(51) Int. Cl.
*H01C 7/12* (2006.01)
(52) U.S. Cl. .......................................... 361/18; 361/118
(58) Field of Classification Search ................ 361/18, 361/118
See application file for complete search history.

(56) References Cited

U.S. PATENT DOCUMENTS
2010/0309694 A1 * 12/2010 Huang et al. .................... 363/49
* cited by examiner

*Primary Examiner* — Danny Nguyen
(74) *Attorney, Agent, or Firm* — Muncy, Geissler, Olds & Lowe, PLLC

(57) ABSTRACT

Apparatus and method for draining stored power are disclosed, which the apparatus and method are applied to an EMI filter circuit for draining power. When the power supply circuit is not working, the apparatus provides a bleeder resistor to drain the power stored in the capacitors of the EMI filter circuit. On the other hand, when the power supply circuit is working, the apparatus provides an open-circuit resistor which has extremely large electrical resistance in order to stop draining power. Thus, the apparatus for draining stored power will not cause extra power waste.

14 Claims, 3 Drawing Sheets

APPARATUS AND METHOD FOR DRAINING STORED POWER

BACKGROUND OF THE INVENTION

1. Field of the Invention

The present invention is related to apparatus and method for draining stored power, especially to the apparatus and method for draining stored power of an EMI filter circuit.

2. Description of Related Art

Generally, the circuit for power supply usually includes an EMI (electromagnetic interference) filter circuit for eliminating EMI of the power and the signals. The EMI filter circuit has at least a capacitor. Sometimes, a user may get an electric shock because of the electric power stored in the capacitor. Thus, in the aspect of safety and stability, a bleeder (usually a resistor) is provided to the EMI filter circuit in order to drain the power stored in the capacitor when the circuit for power supply is not working.

In such a circuit, the bleeder is usually parallel connected with the EMI filter circuit. Thus, the bleeder may continuously consume the power stored in the capacitor even when the circuit for power supply is currently operating. Briefly speaking, the bleeder may cause unexpected power loss.

SUMMARY OF THE INVENTION

In light of the aforementioned problems, the present invention discloses and provides apparatus and method for draining stored power. With purpose, the apparatus and method are for draining the power stored in the capacitors of an EMI filter circuit when the power supply circuit is not operating. And for which, the EMI filter circuit is contained in the power supply circuit for eliminating electromagnetic interference. The disadvantage here is that when the power supply circuit is working, the apparatus provides an open-circuit resistor which has electrical resistance approaching infinity in order to stop draining the stored power of the EMI filter circuit. By doing this, the efficiency of the power supply circuit will be increased.

To achieve these mentioned purposes, the present invention discloses an apparatus which is applied to an EMI filter circuit for draining stored power; wherein the apparatus includes a detection unit and a power consumption unit. The detection unit is for detecting an alternating current power which is inputted into an input end of the EMI filter circuit, so as to determine whether the power supply circuit is working. A detection signal is generated according to the detection result by the detection unit. The power consumption unit is coupled with the EMI filter circuit and the detection unit, for receiving the detection signal and draining the power stored in the EMI filter circuit according to the detection signal.

When accomplished, if the detection signal shows that the power supply circuit is not working (shut down), the power consumption unit then provides a bleeder resistor for draining the power stored in at least a capacitor of the EMI filter circuit. On the other hand, if the detection signal shows that the power supply circuit is currently working (turned on), the power consumption unit then provides an open-circuit resistor which has electrical resistance approaching infinity in order to stop draining the power stored in the capacitor of the EMI filter circuit. In other words, the open-circuit resistor makes the power consumption unit as an open-circuit component for the EMI filter circuit. Thus, the power stored in the EMI filter circuit will not be drained, because there is nearly no electrical current flowing into the power consumption unit.

The present invention further provides a method which is applied to an EMI filter circuit for draining stored power. The method includes: detecting an alternating current power which is inputted into the EMI filter circuit through an input end of the EMI filter circuit. Further, the operation status (working or not) of the power supply circuit is determined according to the detection result.

After that, the power stored in the EMI filter circuit is drained or not according to the determination result. Particularly, if the power supply circuit is not working, a bleeder resistor is provided for draining the power stored in the EMI filter circuit. Otherwise, if the power supply circuit is working, an open-circuit resistor (which has electrical resistance approaching infinity) is then provided in order to stop draining the power. Because of the high resistance which the open-circuit resistor provides, there is nearly no current flowing through the open-circuit resistor. Therefore, the power will not be wasted.

By providing a bleeder resistor when the power supply circuit is not working, the power stored in the EMI circuit is drained for achieving safety and stability purposes. On the other hand, when the power supply circuit is working, an open-circuit resistor is provided in order to stop draining the power of the EMI filter circuit, for reducing power waste.

For further understanding of the invention, reference is made to the following detailed description illustrating the embodiments and examples of the invention. The description is only for illustrating the invention, not for limiting the scope of the claims which provide the only full description of this invention.

BRIEF DESCRIPTION OF THE DRAWINGS

The drawings included herein provide further understanding of the invention. A brief introduction for the drawings follows.

DETAILED DESCRIPTION OF THE PREFERRED EMBODIMENTS

Figure 1:
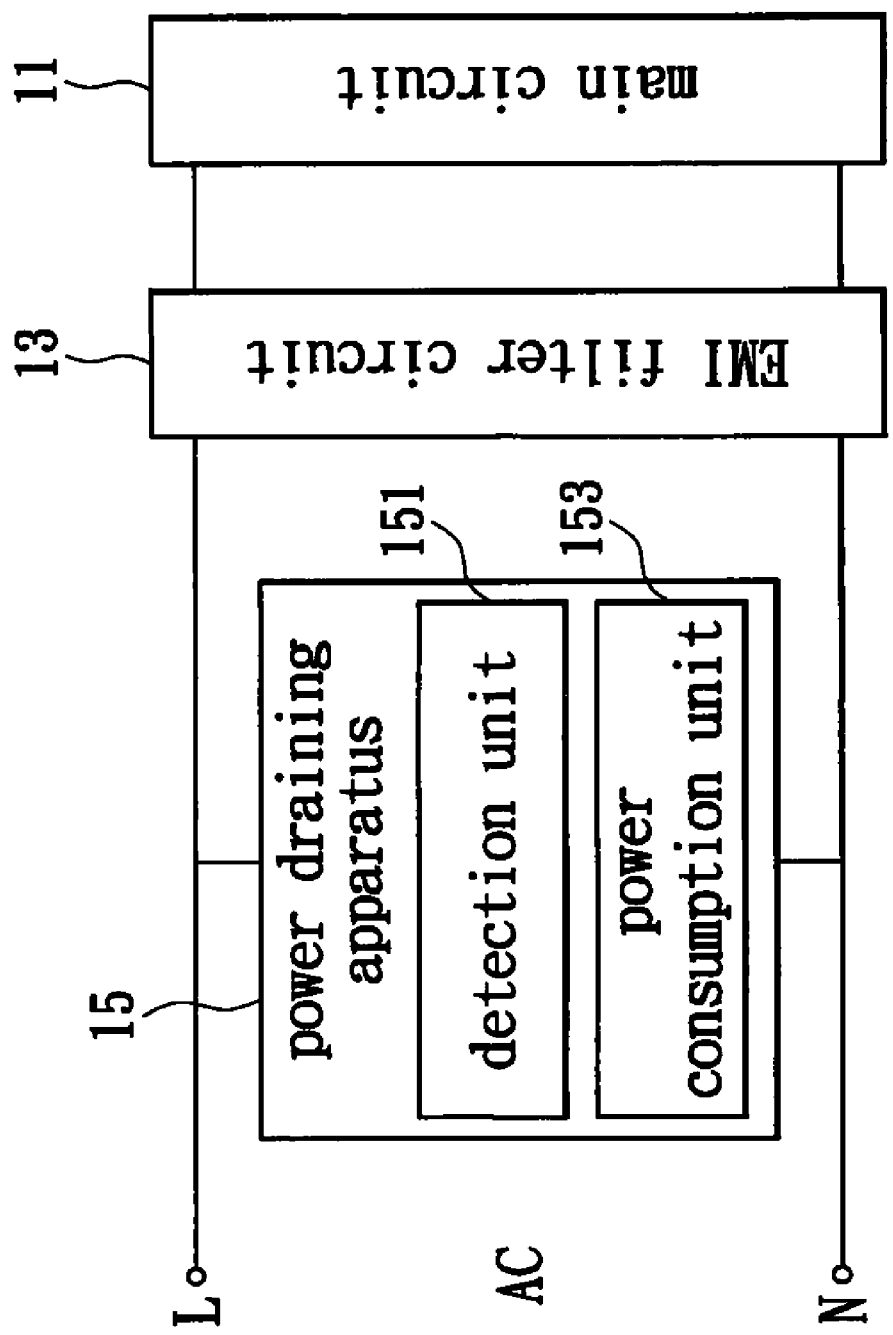
FIG. 1 is a block diagram of an embodiment of power supply circuit according to the present invention.

Please refer to FIG. 1, which is a block diagram of an embodiment of a power supply circuit. The power supply circuit includes a main circuit 11, an EMI filter circuit 13, and a power draining apparatus 15. Wherein the EMI filter circuit 13 is coupled with the main circuit 11 for eliminating electromagnetic interference. The power draining apparatus 15 is coupled with the EMI filter circuit 13 for draining the power stored in at least one capacitor of the EMI filter circuit 13.

The power draining apparatus 15 has a detection unit 151 and a power consumption unit 153, in which the detection unit 151 and the power consumption unit 153 are coupled with each other. The detection unit 151 is for detecting an alternating current power AC which is inputted into the EMI filter circuit 13 through an input end. After that, operation status of the power supply circuit is determined according to the detection result, and a detection signal is then generated and transmitted to the power consumption unit 153.

The detection unit 151 is a device which can detect voltage variation, such as a voltage multiplier. When the alternating current power AC is inputted through the input end of the EMI filter circuit 13, the detection signal is then generated. Specifically, if the power consumption unit 153 receives the detection signal, it means that the power supply circuit is working. On the other hand, if the power consumption unit 153 does not receive the detection signal, it means that the power supply circuit is not currently operating.

The power consumption unit 153 is a device for draining the power stored in the capacitors of the EMI filter circuit 13. When the power supply circuit is not currently working, the power consumption unit 153 provides a bleeder resistor for consuming the power stored in the capacitors of the EMI filter circuit 13. And if the power supply circuit is working, the power consumption unit 153 then provides an open-circuit resistor for making the power consumption unit 153 as an open-circuit component for the EMI filter circuit 13. Thus, no current will flow into the power consumption unit 153, so the stored power of the EMI filter circuit 13 will not be drained, in order to reduce power waste.

Figure 2:
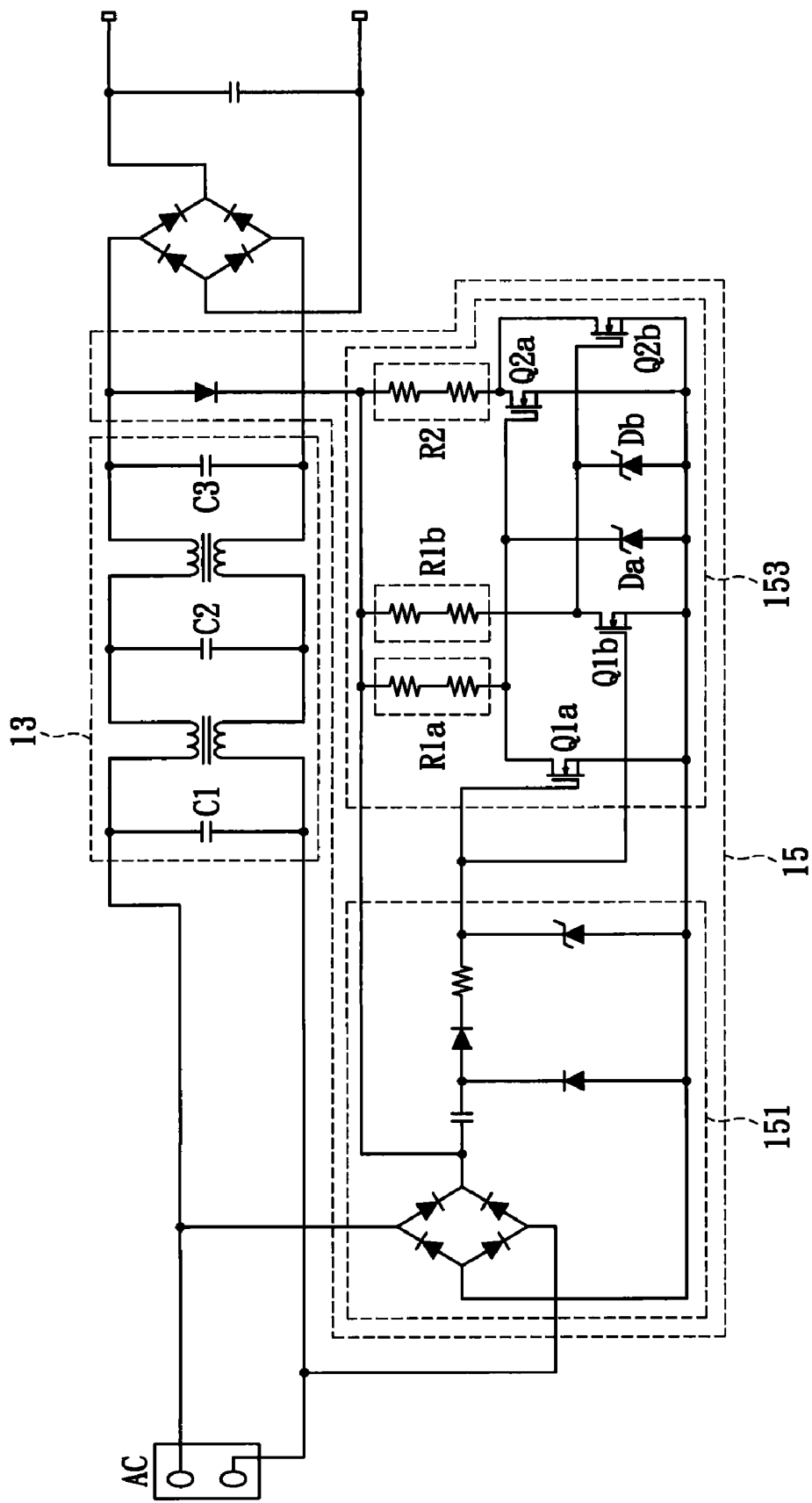
FIG. 2 is a circuit diagram of an embodiment of power supply circuit according to the present invention.

Please refer to FIG. 2, which is a circuit diagram of an embodiment of a power supply circuit. The power supply circuit includes an EMI filter circuit 13 and a power draining apparatus 15, wherein the power draining apparatus 15 has a detection unit 151 and a power consumption unit 153. In this embodiment, the detection unit 151 is a voltage multiplier which captures the voltage variation of the inputted alternating current power AC and generates a detection signal according to the voltage variation; the generated detection signal is then transmitted to the power consumption unit 153. The power consumption unit 153 has first transistor Q1a and Q1b, second transistor Q2a and Q2b, open-circuit resistor R1a and R1b, and bleeder resistor R2.

Specifically, the power consumption unit 153 may have several sets of components. For example, as shown in FIG. 2, the first transistor Q1a, diode Da, and the open-circuit resistor R1a are one circuit set, and the first transistor Q1b, diode Db, and the open-circuit resistor R1b are another circuit set. Thus, if one of the circuit sets is shorted or disabled, there is another circuit set for providing the same functions, in order to make sure that no one will receive electrical shock because of the remaining power in the capacitors of the EMI filter circuit 13.

When the alternating current power AC is inputted (that means the power supply circuit is currently working), the detection unit 151 generates a high-potential detection signal and is transmitted to the first transistor Q1a and Q1b, so the first transistor Q1a and Q1b are able to conduct electricity. And then, gates of the second transistor Q2a and Q2b are connected with low potential level, so the second transistor Q2a and Q2b are cut-off. Thus, for the EMI filter circuit 13, the valid resistors of the power consumption unit 153 only two resistors R1a and R1b remain. Moreover, because the open-circuit resistor R1a and R1b have electrical resistance which approaches infinity, so there is no current flow through the open-circuit resistor R1a and R1b. Consequently, the power consumption unit 153 will not consume any additional power, so the power waste is reduced.

And if the detection unit 151 does not detect the alternating current power AC (that means the power supply circuit is not working), a low-potential detection signal is generated. The first transistor Q1a and Q1b are cut-off because of the detection signal. Thus, for the EMI filter circuit 13, the valid resistors of power consumption unit 153 are open-circuit resistor R1a, R1b paralleled with the bleeder resistor R2. In which, the electrical resistance of open-circuit resistor R1a and R1b are very big, so almost no current flows through them. Therefore, the currents released from capacitors C1, C2, and C3 then flow through the bleeder resistor R2 for power draining. As a result, the power stored in the capacitors C1, C2, and C3 can be drained when the power supply circuit is not working.

Additionally, a bridge rectifier can be provided to the power draining apparatus 15, so that both positive and negative power stored in the capacitors of the EMI filter circuit 13 can be drained correctly and in a safe manner.

Figure 3:
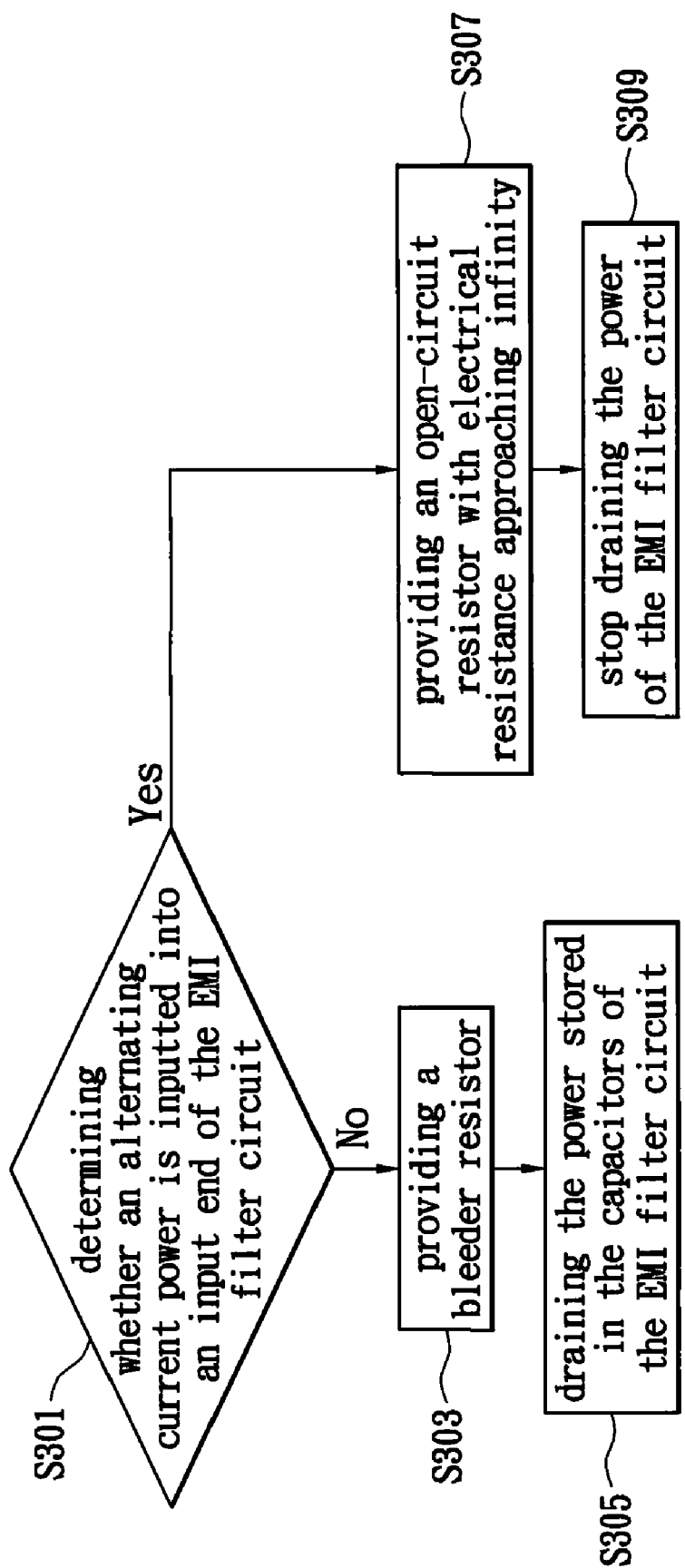
FIG. 3 is a flow chart of an embodiment of method for draining stored power according to the present invention.

Please refer to FIG. 3 corresponding with FIG. 1, in which FIG. 3 is a flow chart of an embodiment of the method for draining stored power. The method is applied to an EMI filter circuit 13, including: the detection unit 151 detects the alternating current power AC which is inputted into the input end of the EMI filter circuit 13, for determining the operation status (working or not) of the power supply circuit (S301). If the determination result shows that there is no alternating current power AC inputted into the EMI filter circuit 13 (which means the power supply circuit is not working), the power consumption unit 153 then provides a bleeder resistor (S303), in order to drain the power stored in the capacitors of the EMI filter circuit 13 (S305).

And if the determination result shows that there is the alternating current power AC inputted into the input end of the EMI filter circuit 13 (which means the power supply circuit is currently working), the power consumption unit 153 then provides an open-circuit resistor which has extremely large electrical resistance (S307). Thus, the power consumption unit 153 stops draining the power stored in the EMI filter circuit 13 (S309), in order to reduce power waste.

As discussed above, the present invention changes the valid resistance of the power draining apparatus according to the operation status of the power supply circuit, so that the power draining apparatus will not cause extra power consumption, in order to reduce power waste.

Some modifications of these examples, as well as other possibilities will, on reading or having read this description, or having comprehended these examples, will occur to those skilled in the art. Such modifications and variations are comprehended within this invention as described here and claimed below. The description above illustrates only a relative few specific embodiments and examples of the invention. The invention, indeed, does include various modifications and variations made to the structures and operations described herein, which still fall within the scope of the invention as defined in the following claims.

What is claimed is:

1. An apparatus for draining a stored power, which is applied to an EMI filter circuit, comprising:
   a detection unit for determining whether an alternating current power is inputted into an input end of the EMI filter circuit so as to generate a detection signal; and
   at least one power consumption unit coupled with the EMI filter circuit and the detection unit, wherein the power consumption unit is for draining the stored power of the EMI filter circuit according to the detection signal;
   wherein when the detection signal indicates that the alternating current power is inputted into the input end of the EMI filter circuit, the power consumption unit provides an open-circuit resistor associated with an electrical resistance approaching an infinity in order to stop draining the stored power of the EMI filter circuit.

2. The apparatus as in claim 1, wherein the detection unit detects a voltage variation at the input end of the EMI filter circuit in order to determine whether the alternating current power is inputted into the input end of the EMI filter circuit.

3. The apparatus as in claim 2, wherein the detection unit is a voltage multiplier circuit, which is for generating the detection signal according to the alternating current power and transmitting the detection signal to the power consumption unit.

4. The apparatus as in claim 1, wherein when the detection signal shows that the alternating current power is not inputted into the input end of the EMI filter circuit, the power consumption unit then drains the stored power of the EMI filter circuit.

5. The apparatus as in claim 4, wherein the power consumption unit provides a bleeder resistor for draining the stored power of the EMI filter circuit.

6. The apparatus as in claim 5, wherein the bleeder resistor is for draining the stored power stored in at least a capacitor of the EMI filter circuit.

7. The apparatus as in claim 6, further comprising a bridge rectifier which is coupled between the capacitor and the bleeder resistor, so that a negative power and a positive power stored in the capacitor are both drained.

8. A method for draining a stored power, which is applied to an EMI filter circuit, comprising:
   determining whether an alternating current power is inputted into an input end of the EMI filter circuit;
   draining the stored power of the EMI filter circuit according to whether the alternating current power is inputted into the input end of the EMI filter circuit; and
   when the alternating current power is determined to have been inputted into the input end of the EMI filter circuit, providing an open-circuit resistor associated with an electrical resistance approaching an infinity in order to stop draining the stored power of the EMI filter.

9. The method as in claim 8, wherein the determining step includes:
   detecting a voltage variation at the input end of the EMI filter circuit, in order to determine whether the alternating current power is inputted into the input end of the EMI filter circuit.

10. The method as in claim 9, wherein the determining step includes:
    using a voltage multiplier for generating a detection signal according to the alternating current power.

11. The method as in claim 8, wherein the draining step includes:
    when the alternating power is not inputted into the input end of the EMI filter circuit, starting to drain the stored power of the EMI filter circuit.

12. The method as in claim 11, wherein the step of starting to drain the power of the EMI filter circuit further comprises providing a bleeder resistor for draining the stored power of the EMI filter circuit.

13. The method as in claim 12, wherein the bleeder resistor is for draining the stored power stored in at least a capacitor of the EMI filter circuit.

14. The method as in claim 13, further comprising:
    providing a bridge rectifier which is coupled between the bleeder resistor and the capacitor, so that a positive power and a negative power stored in the capacitor are both drained.

* * * * *